(12) United States Patent
Suetomi

(10) Patent No.: US 12,326,980 B2
(45) Date of Patent: Jun. 10, 2025

(54) PROGRAM, HEAD-MOUNTED DISPLAY, AND INFORMATION PROCESSING DEVICE

(71) Applicant: DENTSU INC., Tokyo (JP)

(72) Inventor: Ryo Suetomi, Tokyo (JP)

(73) Assignee: DENTSU INC., Tokyo (JP)

( * ) Notice: Subject to any disclaimer, the term of this patent is extended or adjusted under 35 U.S.C. 154(b) by 182 days.

(21) Appl. No.: 18/003,115

(22) PCT Filed: Jun. 22, 2021

(86) PCT No.: PCT/JP2021/023491
§ 371 (c)(1),
(2) Date: Dec. 22, 2022

(87) PCT Pub. No.: WO2021/261463
PCT Pub. Date: Dec. 30, 2021

(65) Prior Publication Data
US 2023/0244318 A1    Aug. 3, 2023

(30) Foreign Application Priority Data

Jun. 24, 2020 (JP) .................... 2020-108746

(51) Int. Cl.
*G06F 3/01* (2006.01)
*G06F 1/16* (2006.01)
(Continued)

(52) U.S. Cl.
CPC ............ *G06F 3/017* (2013.01); *G06F 1/163* (2013.01); *G06F 3/014* (2013.01); *G06F 21/105* (2013.01); *G06T 11/00* (2013.01); *G06F 21/1015* (2023.08)

(58) Field of Classification Search
None
See application file for complete search history.

(56) References Cited

U.S. PATENT DOCUMENTS 10,078,377 B2 *  9/2018  Balan ................... G06T 19/006
10,429,941 B2 * 10/2019  Kamoda ................ G06F 3/011
(Continued)

FOREIGN PATENT DOCUMENTS

| CN | 108108693 A | * | 6/2018 | ......... G06K 9/00228 |
| JP | 2000-101898 A | | 4/2000 | |

(Continued)

OTHER PUBLICATIONS

Ma C; Wu Wei-Zhen, CN108108693 (Translation), 2018 (Year: 2018).*

(Continued)

*Primary Examiner* — Ricky Chin
(74) *Attorney, Agent, or Firm* — Studebaker Brackett PLLC

(57) ABSTRACT

A program executed by a head-mounted display or an information processing device connected to the head-mounted display to provide virtual reality on the head-mounted display, the program causing the head-mounted display or the information processing device to function as: a determination unit that determines a capture range in a virtual space using a hand gesture by a hand of a user in a real space or a hand gesture by an object of a hand in a virtual space; and a capture unit that acquires, as image data, content displayed in the capture range determined in the virtual space.

8 Claims, 7 Drawing Sheets

(51) Int. Cl.
*G06F 21/10* (2013.01)
*G06T 11/00* (2006.01)

(56) References Cited

U.S. PATENT DOCUMENTS

| | | | | |
|---|---|---|---|---|
| 10,852,814 | B1* | 12/2020 | Caron | G06T 19/006 |
| 11,200,742 | B1* | 12/2021 | Post | G06T 19/006 |
| 11,531,402 | B1* | 12/2022 | Stolzenberg | G06F 1/1673 |
| 11,546,505 | B2* | 1/2023 | Canberk | G06F 3/04815 |
| 11,567,578 | B2* | 1/2023 | Yang | G06T 19/006 |
| 11,599,237 | B2* | 3/2023 | Holz | G06F 3/04812 |
| 11,676,349 | B2* | 6/2023 | Holz | G06F 3/011 |
| | | | | 345/633 |
| 11,782,513 | B2* | 10/2023 | Holz | G06T 19/006 |
| | | | | 345/633 |
| 11,798,141 | B2* | 10/2023 | Selstad | G06T 19/20 |
| 11,874,970 | B2* | 1/2024 | Bedikian | G06F 3/0304 |
| 11,925,863 | B2* | 3/2024 | Canberk | A63F 13/537 |
| 12,008,168 | B2* | 6/2024 | Kulbat | B60K 35/80 |
| 2006/0048184 | A1* | 3/2006 | Poslinski | H04N 21/4542 |
| | | | | 348/E5.112 |
| 2011/0316763 | A1 | 12/2011 | Yada | |
| 2013/0009865 | A1* | 1/2013 | Valik | G06F 3/0304 |
| | | | | 345/156 |
| 2014/0225918 | A1* | 8/2014 | Mittal | G06T 19/006 |
| | | | | 345/633 |
| 2015/0293592 | A1* | 10/2015 | Cheong | G06F 1/163 |
| | | | | 345/173 |
| 2015/0381973 | A1* | 12/2015 | Yamamoto | H04N 13/246 |
| | | | | 348/51 |
| 2016/0246369 | A1* | 8/2016 | Osman | A63F 13/212 |
| 2016/0299569 | A1* | 10/2016 | Fisher | G06F 3/011 |
| 2017/0011553 | A1* | 1/2017 | Chen | G02B 27/0172 |
| 2017/0115742 | A1* | 4/2017 | Xing | G06F 3/0485 |
| 2017/0116667 | A1* | 4/2017 | High | G06T 19/006 |
| 2018/0329481 | A1* | 11/2018 | Bronesky | G06F 3/017 |
| 2019/0213798 | A1* | 7/2019 | Griffin | G06F 3/011 |
| 2020/0097707 | A1* | 3/2020 | Chou | H04N 23/695 |
| 2020/0219322 | A1* | 7/2020 | Verma | G06T 11/00 |
| 2021/0170603 | A1* | 6/2021 | Kotlarski | B25J 13/006 |
| 2021/0173471 | A1* | 6/2021 | Johnson | G06T 19/20 |
| 2023/0075650 | A1* | 3/2023 | Eromaki | H04N 21/816 |
| 2023/0244318 | A1* | 8/2023 | Suetomi | G06F 3/0484 |
| | | | | 348/115 |
| 2024/0029113 | A1* | 1/2024 | Suetomi | G06F 3/011 |

FOREIGN PATENT DOCUMENTS

| | | | |
|---|---|---|---|
| JP | 2010-206673 A | | 9/2010 |
| JP | 2016-514298 A | | 5/2016 |
| JP | 2016-133541 A | | 7/2016 |
| JP | 2019-067222 A | | 4/2019 |
| JP | 2019-067456 A | | 4/2019 |
| JP | 2019053714 A | * | 4/2019 ......... G02B 27/0172 |
| WO | 2014/128748 A1 | | 8/2014 |

OTHER PUBLICATIONS

Baba H, JP2019053714 (translation), 2019 (Year: 2019).*
"Notice of Reasons for Refusal" Office Action issued in JP 2020-108746; mailed by the Japanese Patent Office on Jul. 13, 2021.
International Search Report issued in PCT/JP2021/023491; mailed Jul. 27, 2021.
"Final Notification of Reasons for Refusal" Office Action issued in JP 2020-108746; mailed by the Japanese Patent Office on Jan. 25, 2022.
"Decision to Grant a Patent" Office Action issued in JP 2020-108746; mailed by the Japanese Patent Office on Mar. 22, 2022.

* cited by examiner

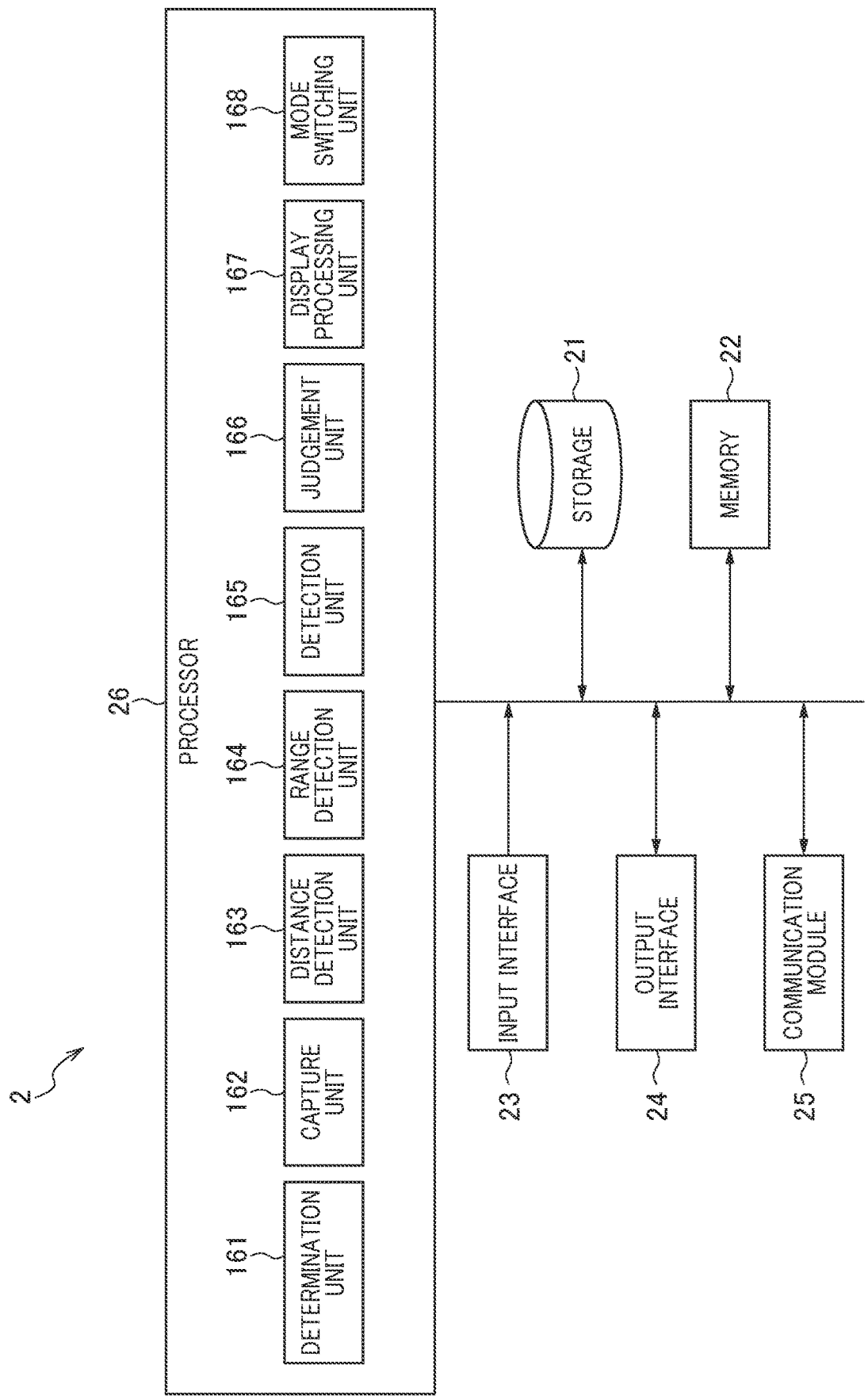

US 12,326,980 B2

PROGRAM, HEAD-MOUNTED DISPLAY, AND INFORMATION PROCESSING DEVICE

TECHNICAL FIELD

The present invention relates to a program, a head-mounted display, and an information processing device.

BACKGROUND ART

Conventionally, a head-mounted display that provides virtual reality (also referred to as VR) has been known, and a user can image an avatar or an object displayed on a virtual space in the virtual space. For example, Patent Literature 1 discloses detecting a movement of any of four limbs of a user and detecting that photographing is performed on the basis of the movement of any of the four limbs.

CITATION LIST

Patent Literature

Patent Literature 1: JP 2019-67456 A

SUMMARY OF INVENTION

Technical Problem

However, in the technology of Patent Literature 1, although it is possible to start photographing in the virtual space from the movement of the user's limbs, there is a problem in that it is difficult to specify a capture range and perform screen capture on the virtual space while the user wears the head-mounted display.

The present invention has been made in view of the above problem, and an object thereof is to provide a program, a head-mounted display, and an information processing device that facilitate acquisition of image data by specifying a capture range in a virtual space.

Solution to Problem

A program according to a first aspect of the present invention is a program executed by a head-mounted display or an information processing device connected to the head-mounted display to provide virtual reality on the head-mounted display, the program causing the head-mounted display or the information processing device to function as: a determination unit that determines a capture range in a virtual space using a hand gesture by a hand of a user in a real space or a hand gesture by an object of a hand in a virtual space; and a capture unit that acquires, as image data, content displayed in the capture range in the virtual space.

With this configuration, the range indicated by the hand of the user in the real space or the range indicated by the object of the hand in the virtual space can be captured and acquired as image data, so that it is possible to easily specify the capture range in the virtual space and acquire the image data.

A program according to a second aspect of the present invention is the program according to the first aspect, the program including: a distance detection unit that detects a distance between a head of the user and a hand of the user in a real space; a range detection unit that detects a range indicated by a hand of a user in a real space or a range indicated by an object of a hand in a virtual space, in which the determination unit determines the capture range in the virtual space on the basis of the range and the distance.

With this configuration, since the capture range in the virtual space changes on the basis of the distance between the head and the hand of the user, it is possible to acquire captured image data in which the angle of view changes on the basis of the distance between the head and the hand of the user.

A program according to a third aspect of the present invention is the program according to the second aspect, in which the distance detection unit detects a distance between the head-mounted display and a glove type device worn on a hand of a user or a controller held in a hand of a user as the distance between the head of the user and the hand of the user.

With this configuration, the distance between the head and the hand of the user can be detected.

A program according to a fourth aspect of the present invention is the program according to any one of the first to the third aspects, the program including: a detection unit that refers to object information in the capture range, and detects a photographing prohibited object or a photographing prohibited avatar; a judgement unit that judges whether a photographing license is given to the user in a case where the photographing prohibited object or the photographing prohibited avatar is detected; and a display processing unit that performs processing of not displaying the photographing prohibited object or the photographing prohibited avatar in a case where a photographing license is not given to the user.

With this configuration, in a case where a photographing prohibited object or a photographing prohibited avatar is included in a capture image range and a photographing license is not given to the user, by performing processing of not displaying the photographing prohibited object or the photographing prohibited avatar, it is possible to prevent the user who is not given the photographing license from acquiring the image data of the photographing prohibited object or the photographing prohibited avatar.

A program according to a fifth aspect of the present invention is the program according to the fourth aspect, in which the processing of not displaying is transmission processing or mosaic processing for the photographing prohibited object or the photographing prohibited avatar, or transmission processing or mosaic processing for the photographing prohibited object or the photographing prohibited avatar shown in the image data.

With this configuration, it is possible to prevent the user who is not given the photographing license from acquiring the image data of the photographing prohibited object or the photographing prohibited avatar.

A program according to a sixth aspect of the present invention is the program according to any one of the first to the fifth aspects, the program including: a detection unit that refers to object information in the capture range, and detects an unauthorized photographing prohibited object or an unauthorized photographing prohibited avatar; a judgement unit that judges whether a photographing license is given to the user in a case where the unauthorized photographing prohibited object or the unauthorized photographing prohibited avatar is detected; and a display processing unit that performs processing of not displaying the unauthorized photographing prohibited object or the unauthorized photographing prohibited avatar in a case where a photographing license is not given to the user.

With this configuration, in a case where an unauthorized photographing prohibited object or an unauthorized photographing prohibited avatar is included in a capture image range and a photographing license is not given to the user, by performing processing of not displaying the unauthorized photographing prohibited object or the unauthorized photographing prohibited avatar, it is possible to prevent the user who is not given the photographing license from acquiring the image data of the unauthorized photographing prohibited object or the unauthorized photographing prohibited avatar.

A program according to a seventh aspect of the present invention is the program according to any one of the first to the sixth aspects, in which the processing of not displaying is transmission processing or mosaic processing for the unauthorized photographing prohibited object or the unauthorized photographing prohibited avatar, or transmission processing or mosaic processing for the unauthorized photographing prohibited object or the unauthorized photographing prohibited avatar shown in the image data.

With this configuration, it is possible to prevent the user who is not given the photographing license from acquiring the image data of the unauthorized photographing prohibited object or the unauthorized photographing prohibited avatar.

A head-mounted display according to an eighth aspect of the present invention includes: a determination unit that determines a capture range in a virtual space by using a hand gesture by a hand of a user in a real space or a hand gesture by an object of a hand in a virtual space; and a capture unit that acquires, as image data, content displayed in the capture range determined in the virtual space.

With this configuration, the range indicated by the hand of the user in the real space or the range indicated by the object of the hand in the virtual space can be captured and acquired as image data, so that it is possible to easily specify the capture range in the virtual space and acquire the image data.

An information processing device according to a ninth aspect of the present invention includes: a determination unit that determines a capture range in a virtual space by using a hand gesture by a hand of a user in a real space or a hand gesture by an object of a hand in a virtual space; and a capture unit that acquires, as image data, content displayed in the capture range determined in the virtual space.

With this configuration, the range indicated by the hand of the user in the real space or the range indicated by the object of the hand in the virtual space can be captured and acquired as image data, so that it is possible to easily specify the capture range in the virtual space and acquire the image data.

Advantageous Effects of Invention

According to an aspect of the present invention, a range indicated by a hand of a user in a real space or a range indicated by an object of a hand in a virtual space can be captured and acquired as image data, so that it is possible to easily specify the capture range in the virtual space and acquire the image data.

BRIEF DESCRIPTION OF DRAWINGS

FIG. 7 is a schematic configuration diagram of an information processing device according to the second embodiment.

DESCRIPTION OF EMBODIMENTS

Hereinafter, each embodiment will be described with reference to the drawings. However, unnecessarily detailed description may be omitted. For example, a detailed description of a well-known matter and a repeated description of substantially the same configuration may be omitted. This is to avoid unnecessary redundancy of the following description and to facilitate understanding of those skilled in the art.

First Embodiment

Figure 1:
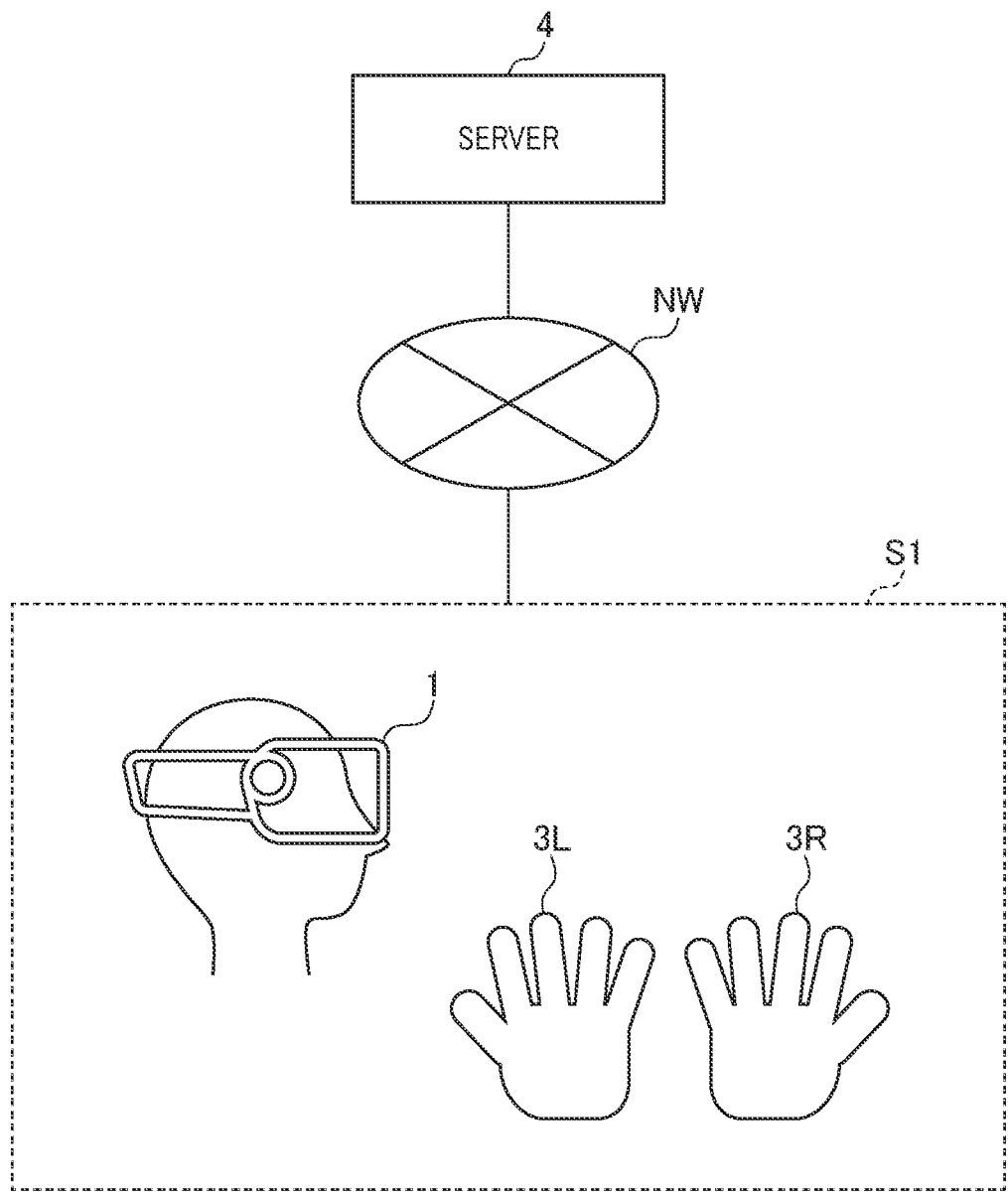
FIG. 1 is a schematic configuration diagram of a head-mounted display system according to a first embodiment.

FIG. 1 is a schematic configuration diagram of a head-mounted display system according to a first embodiment. As illustrated in FIG. 1, a head-mounted display system S1 according to the first embodiment includes a head-mounted display 1, and glove type devices 3L, 3R which are examples of operation devices used by a user. The head-mounted display 1 is connected to a server 4 via a communication circuit network NW. The server 4 stores user information, world information regarding a virtual reality world (referred to as a world), and information on other users in the world. These pieces of information or information obtained by processing these pieces of information are transmitted from the server 4 to the head-mounted display 1 via the communication circuit network NW.

Figure 2:
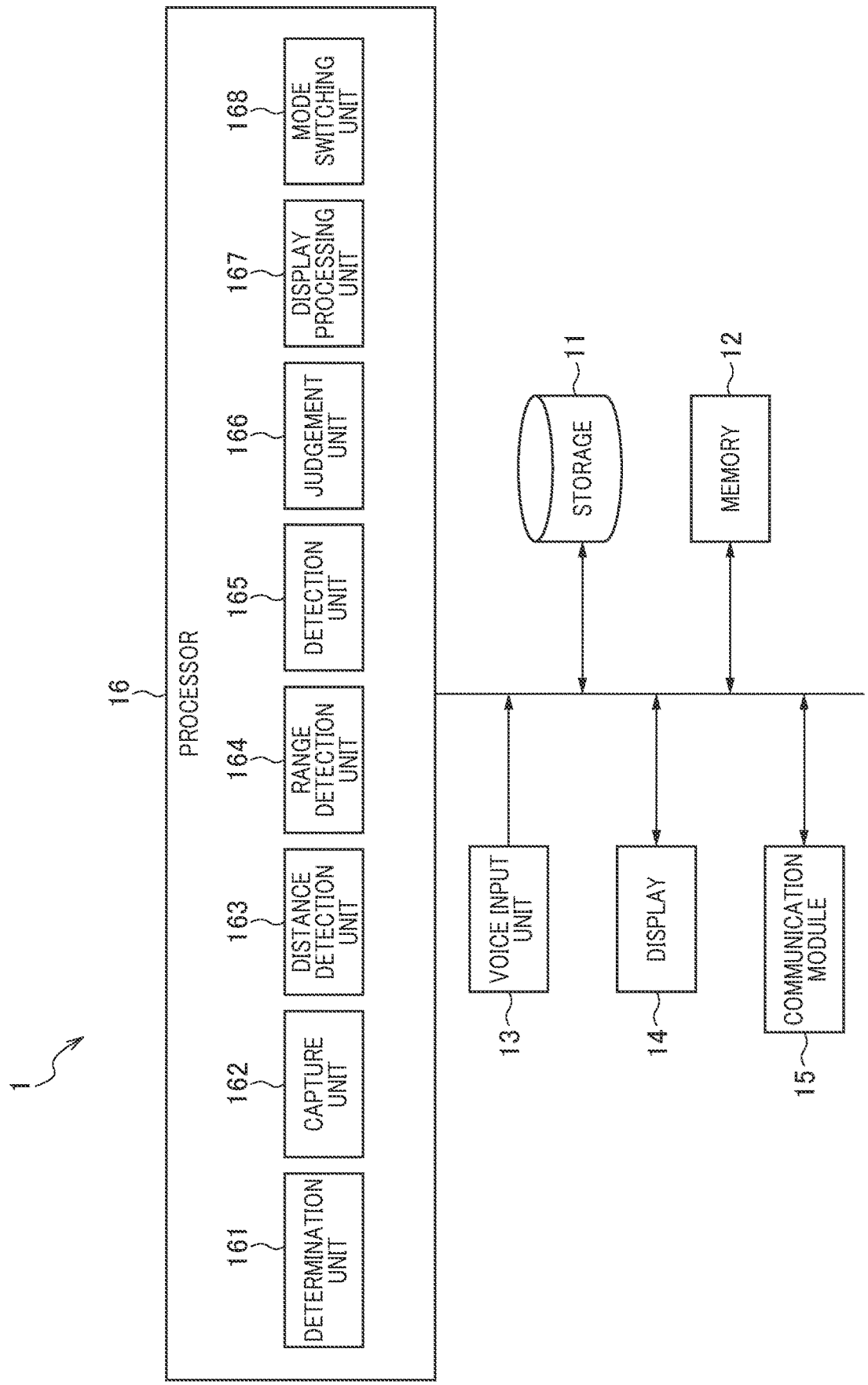
FIG. 2 is a schematic configuration diagram of a head-mounted display according to the first embodiment.

FIG. 2 is a schematic configuration diagram of a head-mounted display according to the first embodiment. As illustrated in FIG. 2, the head-mounted display 1 according to the first embodiment includes a storage 11, a memory 12, a voice input unit 13, a display 14, a communication module 15, and a processor 16. Note that the head-mounted display 1 may include a camera.

The storage 11 stores a program read and executed by the processor 16. The memory 12 temporarily holds information. The voice input unit 13 receives a voice from a user. The display 14 displays an image for VR and provides virtual reality to the user according to a command of the processor 16. The communication module 15 communicates with the server 4 and the glove type devices 3L, 3R. This communication may be wired or wireless.

The processor 16 functions as a determination unit 161, a capture unit 162, a distance detection unit 163, a range detection unit 164, a detection unit 165, a judgement unit 166, a display processing unit 167, and a mode switching unit 168 by reading and executing the program from the storage 11.

The determination unit 161 determines a capture range in the virtual space by using a hand gesture by a hand of the user in the real space or a hand gesture by an object of the hand in the virtual space. Here, the hand gesture is a gesture expressed using a hand of the user or an object of the hand.

The capture unit 162 acquires, as image data, the content displayed in the capture range determined by the determination unit 161 in the virtual space. In the present embodiment, as an example, in a case where the voice input unit 13 receives an instruction of the user (for example, a photographing instruction or a capture instruction), the capture unit 162 acquires, as image data, the content displayed in the capture range determined by the determination unit 161 in the virtual space.

The distance detection unit 163 detects a distance between the head of the user and a hand of the user in the real space. Specifically, for example, the distance detection unit 163 detects the distance between the glove type devices 3L, 3R worn on the hands of the user and the head-mounted display 1 as the distance between the head of the user and the hands of the user. Note that, in a case where a controller held in a hand of the user is used instead of the glove type devices 3L, 3R, the distance detection unit 163 may detect the distance between the controller (for example, a hand tracking controller or a grip type controller) held in the hand of the user and the head-mounted display 1 as the distance between the head of the user and the hand of the user. In any configuration, the distance between the head and the hand of the user can be detected. Here, the distance may be determined, for example, from an imaged image of the glove type devices 3L, 3R imaged by a camera provided in the head-mounted display 1 or an imaged image of the head-mounted display 1 and the glove type devices 3L, 3R captured by a camera provided outside, or may be determined from a round-trip time of communication (for example, infrared communication) between the glove type devices 3L, 3R and the head-mounted display 1, or may be determined by another known method.

The range detection unit 164 detects a range indicated by a hand of the user in the real space or a range indicated by an object of the hand in the virtual space. Here, for example, in a case where the glove type devices 3L, 3R include a sensor capable of tracking for each finger, the range indicated by the hands of the user in the real space may be detected by the communication module 15 using tracking signals received from the glove type devices 3L, 3R, or in a case where the head-mounted display 1 is provided with a camera, the range indicated by the hands of the user in the real space may be detected from an image of the glove type devices 3L, 3R imaged by the camera, or another known method may be used.

The determination unit 161 determines the capture range in the virtual space on the basis of the range detected by the range detection unit 164 and the distance detected by the distance detection unit 163, for example, according to a predetermined rule or correspondence. With this configuration, since the capture range in the virtual space changes on the basis of the distance between the head and the hand of the user, it is possible to acquire captured image data in which the angle of view changes on the basis of the distance between the head and the hand of the user.

The detection unit 165 refers to object information in the capture range, and detects a photographing prohibited object or a photographing prohibited avatar.

In a case where the photographing prohibited object or the photographing prohibited avatar is detected, the judgement unit 166 judges whether a photographing license is given to the user.

In a case where a photographing license is not given to the user, the display processing unit 167 performs processing of not displaying the photographing prohibited object or the photographing prohibited avatar. The processing of not displaying is transmission processing or mosaic processing for the photographing prohibited object or the photographing prohibited avatar, or transmission processing or mosaic processing for the photographing prohibited object or the photographing prohibited avatar shown in the image data.

In addition, the detection unit 165 refers to object information in the capture range, and detects an unauthorized photographing prohibited object or an unauthorized photographing prohibited avatar.

In a case where the photographing prohibited object or the photographing prohibited avatar is detected, the judgement unit 166 judges whether a photographing license is given to the user.

In a case where a photographing license is not given to the user, the display processing unit 167 performs processing of not displaying the unauthorized photographing prohibited object or the unauthorized photographing prohibited avatar. With this configuration, in a case where a photographing prohibited object or a photographing prohibited avatar is included in a capture image range and a photographing license is not given to the user, by performing processing of not displaying the photographing prohibited object or the photographing prohibited avatar, it is possible to prevent the user who is not given the photographing license from acquiring the image data of the photographing prohibited object or the photographing prohibited avatar. The processing of not displaying is transmission processing or mosaic processing for the unauthorized photographing prohibited object or the unauthorized photographing prohibited avatar, or transmission processing or mosaic processing for the unauthorized photographing prohibited object or the unauthorized photographing prohibited avatar shown in the image data.

Figure 3:
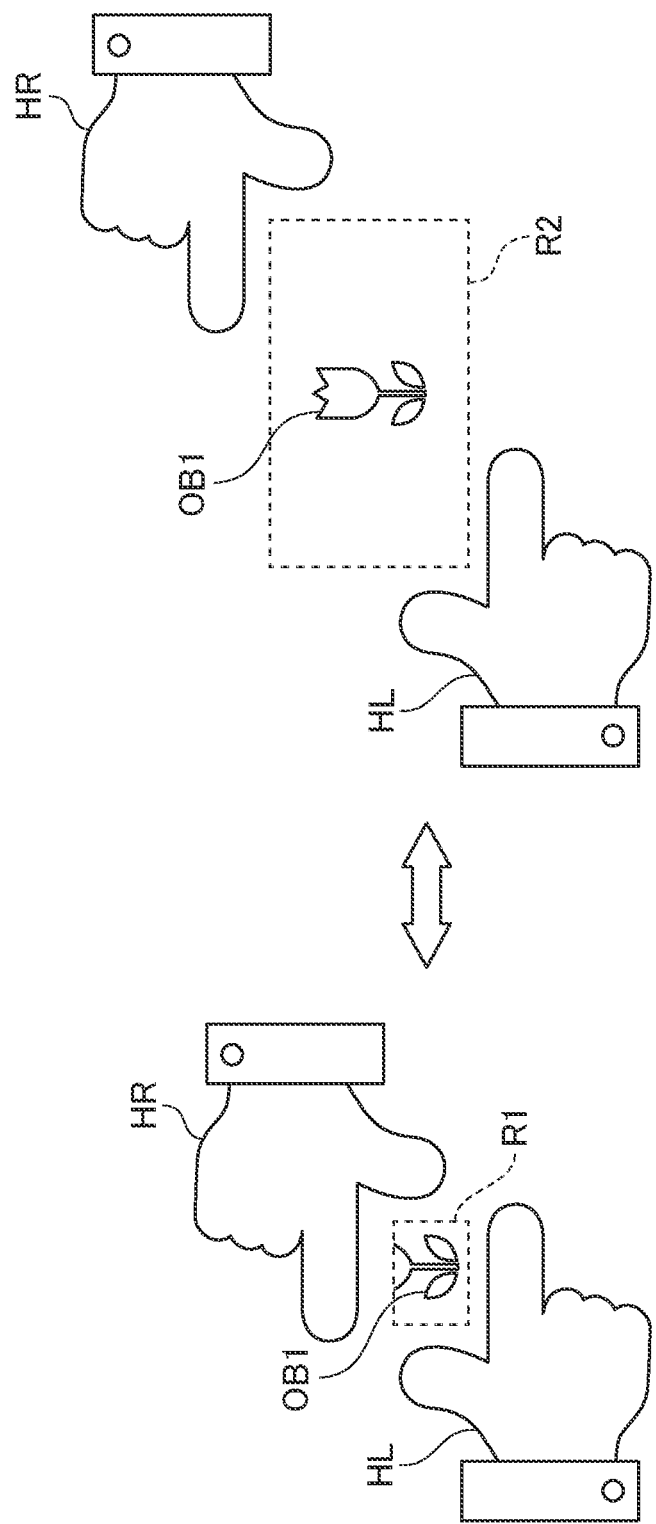
FIG. 3 is a schematic diagram for explaining a range indicated by an object of a hand in a virtual space.

FIG. 3 is a schematic diagram for explaining a range indicated by an object of a hand in a virtual space. As illustrated in FIG. 3, a left hand object HL and a right hand object HR are displayed in the virtual space so as to correspond to the positional relationship with the glove type devices 3L, 3R in the real space. Then, two diagonal points out of the four corners of a rectangle are specified by the left hand object HL and the right hand object HR, whereby a capture range R1 is specified by the hand objects. A part of an object OB1 is displayed within the capture range R1. In this manner, the capture range (also referred to as a capture size) changes with the size of a quadrilateral created by the hand objects in the virtual space. This capture range can be saved as image data in a standard recording format such as full high definition (FHD) or 4K.

Here, when the glove type devices 3L, 3R in the real space are separated, the left hand object HL and the right hand object HR in the virtual space are separated correspondingly, and the capture range extends from the capture range R1 to a capture range R2. As a result, the entire same object OB1 is displayed within the capture range R2. As described above, the left hand object HL and the right hand object HR in the virtual space move according to the positional relationship with the glove type devices 3L, 3R in the real space, and the capture range in the virtual space is changed by, for example, a predetermined algorithm.

Next, with reference to FIGS. 4A and 4B, it will be described that an image displayed on the head-mounted display changes on the basis of the distance between the head-mounted display and the glove type devices in the real space.

Figure 4A:
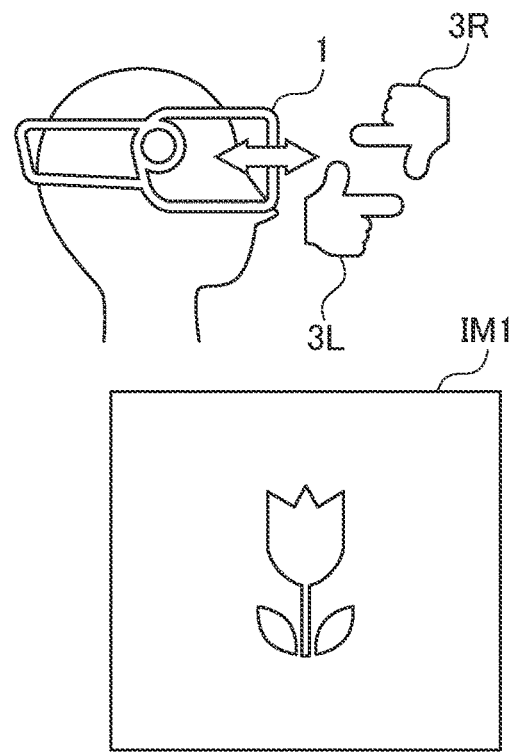
FIG. 4A is an example of a positional relationship between a head-mounted display and glove type devices in a real space, and captured image data.

FIG. 4A is an example of a positional relationship between the head-mounted display and the glove type devices in a real space, and captured image data. As illustrated in FIG. 4A, as the distance between the head-mounted display 1 and the glove type devices 3L, 3R is shorter, the capture range in the virtual space is displayed at a wider angle, and content displayed in the capture range is acquired as image data in response to a photographing instruction of the user. As a result, for example, an image IM1 is obtained.

Figure 4B:
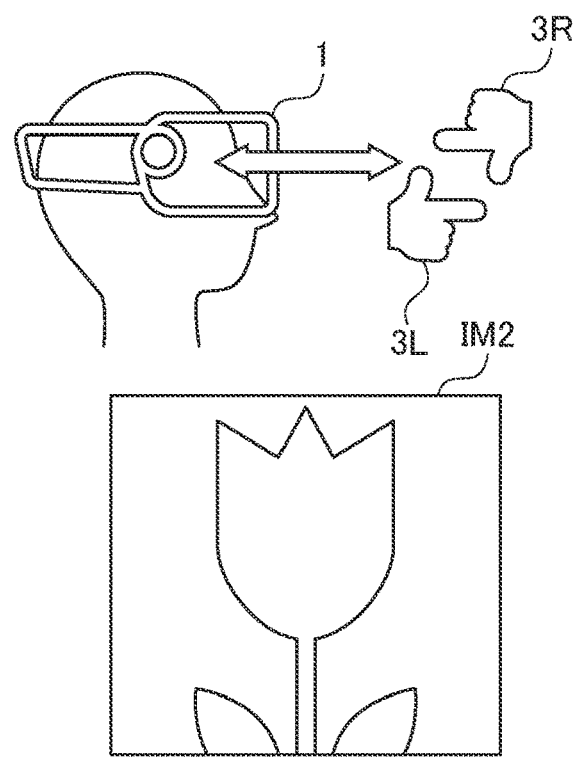
FIG. 4B is another example of the positional relationship between the head-mounted display and the glove type devices in the real space, and captured image data.

FIG. 4B is another example of the positional relationship between the head-mounted display and the glove type devices in the real space, and captured image data. As illustrated in FIG. 4B, as the distance between the head-mounted display 1 and the glove type devices 3L, 3R is longer, the capture range in the virtual space is displayed at a narrower angle, and content displayed in the capture range is acquired as image data in response to a photographing instruction of the user. As a result, for example, an image IM2 is obtained. As described above, the angle of view changes on the basis of the distance between the head-mounted display 1 and the glove type devices 3L, 3R (that is, the distance between the hands and the head of the user).

Figure 5:
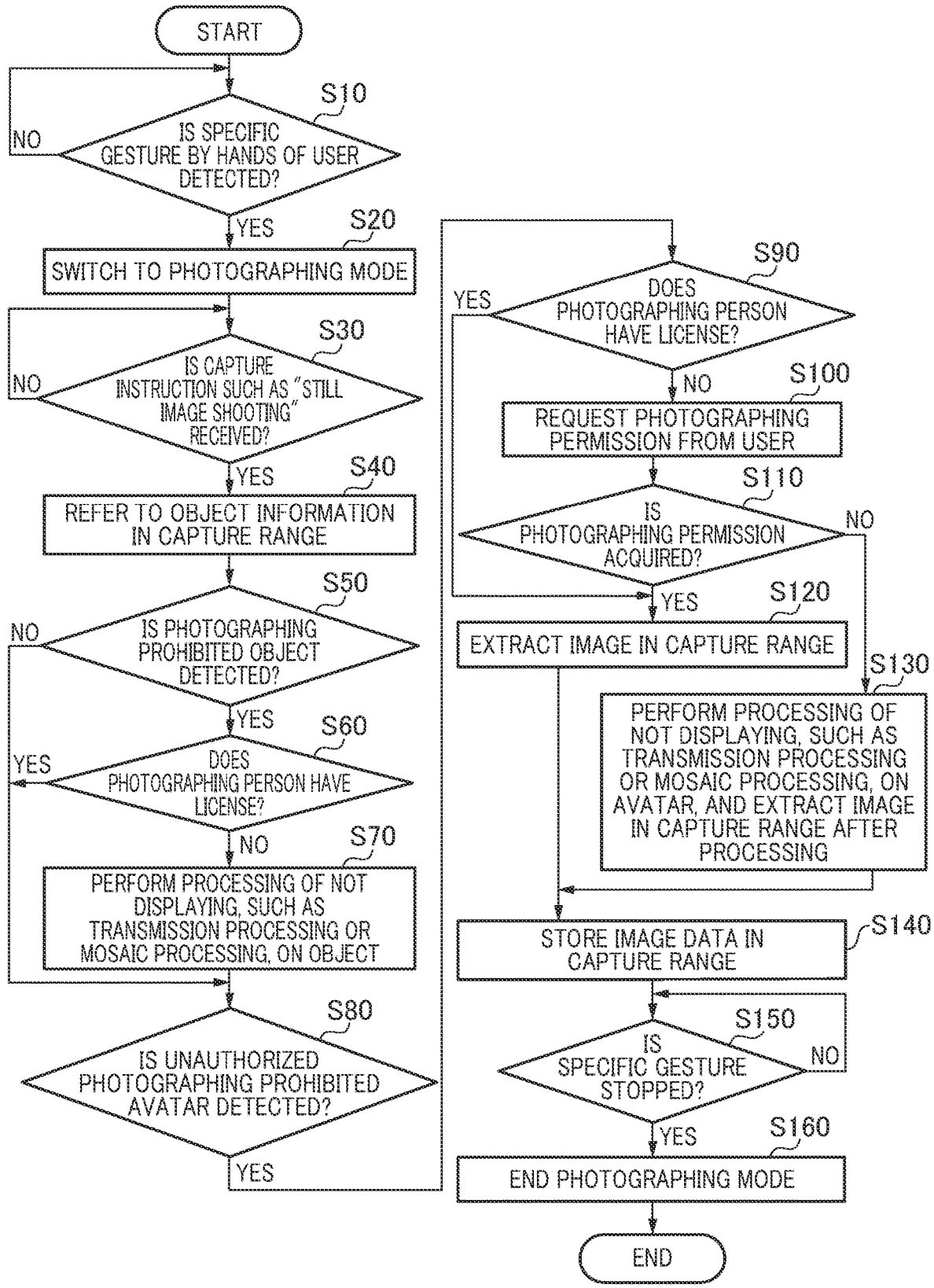
FIG. 5 is a flowchart illustrating an example of processing according to the first embodiment.

FIG. 5 is a flowchart illustrating an example of processing according to the first embodiment.

(Step S10) The judgement unit 166 judges whether a specific gesture (also referred to as a hand gesture) by the hands of the user is detected. The gesture may be made by an actual hand of the user or an object of a hand in the virtual space depending on the operation device used by the user.

(Step S20) In a case where the gesture by the hands of the user is detected in step S10, the mode switching unit 168 switches the mode to a photographing mode.

(Step S30) The judgement unit 166 judges whether the voice input unit 13 has received a capture instruction by voice such as "still image shooting". Note that, here, when a moving image is imaged, a moving image photographing instruction may be received by a voice instruction such as "start recording". Furthermore, photographing of a still image or a moving image may be started by another input signal (for example, in a case where there is a button on an operation device used by the user, a button on/off signal transmitted from a controller when the user presses the button) instead of a voice instruction.

(Step S40) The detection unit 165 refers to the object information in the capture range (also referred to as a frame range).

(Step S50) The judgement unit 166 judges whether the detection unit 165 has detected a photographing prohibited object. In a case where a photographing prohibited object has not been detected, the processing proceeds to step S80.

(Step S60) In a case where a photographing prohibited object is detected in step S50, the judgement unit 166 judges whether the photographing person has a license for the detected photographing prohibited object. In a case where the photographing person has a license for the detected photographing prohibited object, the processing proceeds to step S80.

(Step S70) In a case where the photographing person does not have a license for the photographing prohibited object detected in step S60, for example, processing of not displaying, such as transmission processing or mosaic processing, is performed on the object. Then, the processing proceeds to step S80.

(Step S80) The judgement unit 166 judges whether the detection unit 165 has detected an unauthorized photographing prohibited avatar.

(Step S90) In a case where an unauthorized photographing prohibited avatar is detected in step S80, the judgement unit 166 judges whether the photographing person has a license for the detected unauthorized photographing prohibited avatar. In a case where the photographing person has a license for the detected unauthorized photographing prohibited avatar, the processing proceeds to step S120.

(Step S100) In a case where the photographing person does not have a license for the unauthorized photographing prohibited avatar detected in step S90, a photographing permission is requested of the user corresponding to the unauthorized photographing prohibited avatar. Here, the user is, for example, a user who creates and/or manages and/or owns the unauthorized photographing prohibited avatar.

(Step S110) The judgement unit 166 judges whether the photographing permission is acquired from the user. For example, processing of not displaying, such as transmission processing or mosaic processing, is performed on the object. Then, the processing proceeds to step S80.

(Step S120) In a case where the photographing permission is acquired from the user in step S110, an image in the capture range (frame range) is extracted. Then, the processing proceeds to step S140.

(Step S130) In a case where the photographing permission is not acquired from the user in step S110, processing of not displaying, such as transmission processing or mosaic processing, is performed on the avatar, and an image in the capture range after the processing is extracted. Then, the processing proceeds to step S140.

(Step S140) The capture unit 162 stores the image data in the capture range in the storage 11, for example. The storage destination does not need to be the storage 11, and may be the server 4 or a cloud storage.

Note that the capture unit 162 may acquire pre-rendered image data from the server 4 or the storage 11. Here, the pre-rendered image data is an image rendered in advance, and is image data having a higher resolution than that of an image at the time of normal photographing. Then, the capture unit 162 may store pre-rendered image data within the capture range (frame range). Alternatively, pre-rendered image data may be stored on the server 4 or a cloud.

(Step S150) The judgement unit 166 judges whether a specific gesture (hand gesture) by the hands of the user has been stopped.

(Step S160) In a case where it is judged in step S160 that the specific gesture (hand gesture) has been stopped, the mode switching unit 168 ends the photographing mode.

As described above, the program according to the first embodiment is a program executed by the head-mounted display 1 to provide virtual reality on the head-mounted display 1, the program causing the head-mounted display 1 to function as: the determination unit 161 that determines a capture range in a virtual space using a hand gesture by a hand of a user in a real space or a hand gesture by an object of a hand in a virtual space; and the capture unit 162 that acquires, as image data, content displayed in the capture range in the virtual space.

Furthermore, the head-mounted display 1 according to the first embodiment includes: the determination unit 161 that determines a capture range in a virtual space by using a hand gesture by a hand of a user in a real space or a hand gesture by an object of a hand in a virtual space; and a capture unit 162 that acquires, as image data, content displayed in the capture range in the virtual space.

With this configuration, the range indicated by the hand of the user in the real space or the range indicated by the object of the hand in the virtual space can be captured and acquired as image data, so that it is possible to easily specify the capture range in the virtual space and acquire the image data.

Second Embodiment

Next, a second embodiment will be described. In the first embodiment, the head-mounted display 1 executes the program, but in the second embodiment, an information processing device 2 connected to the head-mounted display 1 executes the program.

Figure 6:
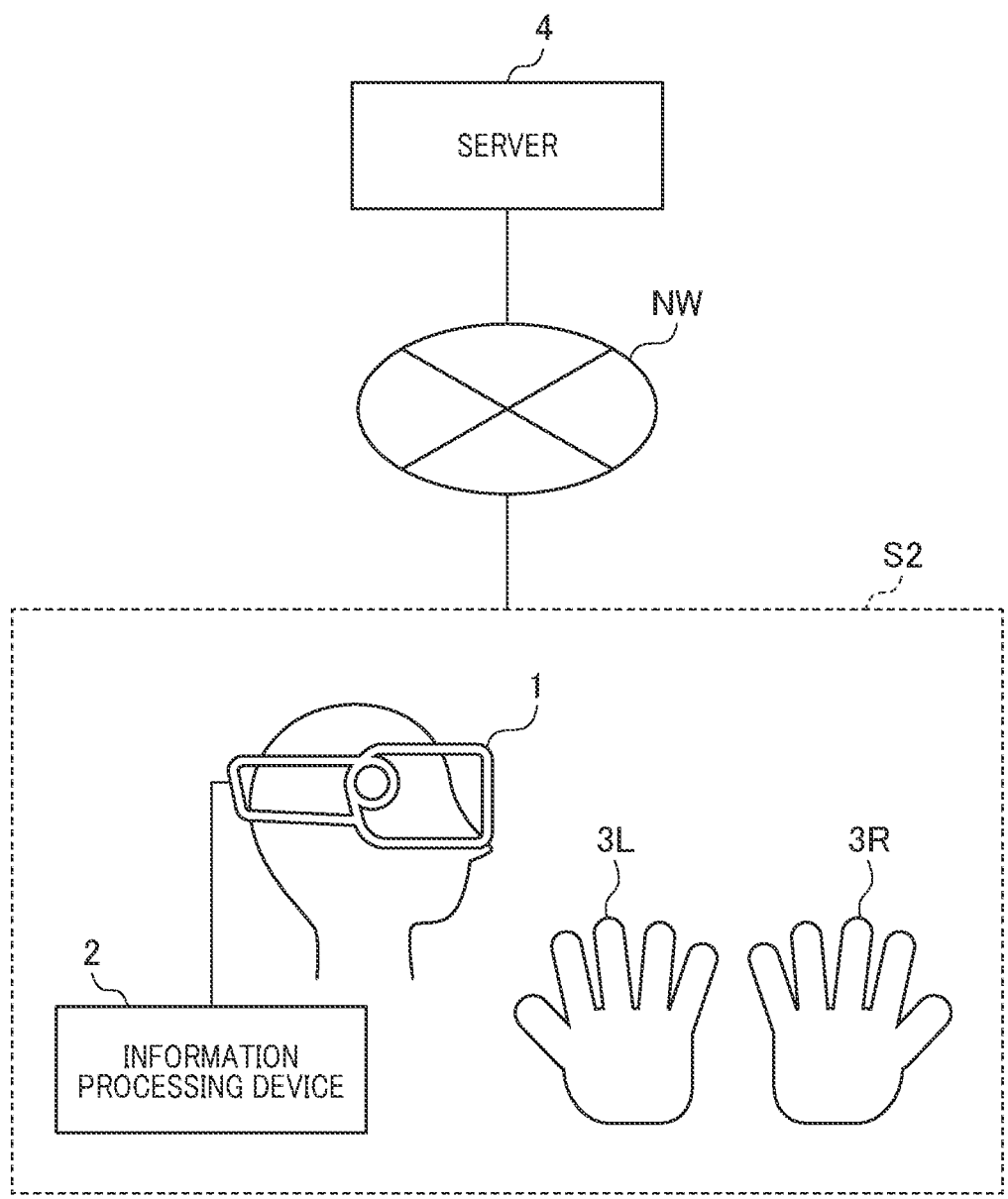
FIG. 6 is a schematic configuration diagram of a head-mounted display system according to a second embodiment.

FIG. 6 is a schematic configuration diagram of a head-mounted display system according to the second embodiment. As compared with the head-mounted display system S1 of FIG. 1, a head-mounted display system S2 has a configuration in which the information processing device 2 connected to the head-mounted display 1 is added. The information processing device 2 is, for example, a computer.

FIG. 7 is a schematic configuration diagram of an information processing device according to the second embodiment. As illustrated in FIG. 7, the information processing device 2 includes a storage 21, a memory 22, an input interface 23, an output interface 24, a communication interface 25, and a processor 26.

The storage 21 stores a program according to the present embodiment. The memory 22 temporarily stores data. The input interface 23 receives an input from the user. The output interface 24 is connected to, for example, the head-mounted display 1 via wiring, and outputs a video signal to the head-mounted display 1. As an example, the connection will be described as a wired connection, but the connection may be made by wireless communication. The communication module 15 communicates with the server 4 and the glove type devices 3L, 3R. This communication may be wired or wireless.

The processor 26 functions as the determination unit 161, the capture unit 162, the distance detection unit 163, the range detection unit 164, the detection unit 165, the judgement unit 166, the display processing unit 167, and the mode switching unit 168 by reading and executing the program from the storage 21. Since the processing by these units is similar to that of the first embodiment, the description thereof will be omitted.

As described above, the program according to the second embodiment is a program executed by the information processing device 2 connected to the head-mounted display 1 to provide virtual reality on the head-mounted display 1, the program causing the information processing device 2 to function as: the determination unit 161 that determines a capture range in a virtual space using a hand gesture by a hand of a user in a real space or a hand gesture by an object of a hand in a virtual space; and the capture unit 162 that acquires, as image data, content displayed in the capture range in the virtual space.

Furthermore, the information processing device 2 according to the second embodiment includes: the determination unit 161 that determines a capture range in a virtual space by using a hand gesture by a hand of a user in a real space or a hand gesture by an object of a hand in a virtual space; and a capture unit 162 that acquires, as image data, content displayed in the capture range in the virtual space.

With this configuration, the range indicated by the hand of the user in the real space or the range indicated by the object of the hand in the virtual space can be captured and acquired as image data, so that it is possible to easily specify the capture range in the virtual space and acquire the image data.

In each embodiment, a cloud may be used instead of the server 4.

Note that at least a part of the head-mounted display 1 or the information processing device 2 described in the above-described embodiments may be configured by hardware or software. In the case of being configured by software, a program for implementing at least some functions of the head-mounted display 1 or the information processing device 2 may be stored in a recording medium such as a flexible disk or a CD-ROM, and may be read and executed by a computer. The recording medium is not limited to a removable recording medium such as a magnetic disk or an optical disk, and may be a fixed recording medium such as a hard disk device or a memory.

In addition, a program for implementing at least some functions of the head-mounted display 1 or the information processing device 2 may be distributed via a communication line (including wireless communication) such as the Internet. Furthermore, the program may be distributed via a wired line or a wireless line such as the Internet or by being stored in a recording medium, in an encrypted, modulated, or compressed state.

Furthermore, the information processing device 2 may be caused to function by one or a plurality of information processing devices. In the case of using a plurality of information processing devices, one of the plurality of information processing devices may be a computer, and a function may be implemented as at least one unit of the information processing device 2 by the computer executing a predetermined program.

As described above, the present invention is not limited to the above-described embodiments as they are, and can be embodied by modifying the components without departing from the gist of the present invention in the implementation stage. In addition, various inventions can be formed by appropriately combining a plurality of components disclosed in the above embodiments. For example, some components may be deleted from all the components shown in the embodiments. Furthermore, components in different embodiments may be appropriately combined.

REFERENCE SIGNS LIST

1 head-mounted display
11 storage
12 memory
13 voice input unit
14 display
15 communication module
16 processor
161 determination unit
162 capture unit
163 distance detection unit
164 range detection unit
165 detection unit
166 judgement unit
167 display processing unit
168 mode switching unit
2 Information processing device
21 storage
22 memory
23 input interface
24 output interface
25 communication interface
26 processor
3L, 3R glove type device
4 server
S1, S2 head-mounted display system

The invention claimed is:

1. A non-transitory computer-readable recording medium storing a program executed by a head-mounted display or an information processing device connected to the head-mounted display to provide virtual reality on the head-mounted display, the program causing a processor of the head-mounted display or the information processing device to:

determine a capture range in a virtual space using a hand gesture by a hand of a user in a real space or a hand gesture by an object representing the hand in a virtual space; and acquire, as image data, content displayed in the capture range in the virtual space, wherein the capture range is determined before the content is acquired, and the program further causes the processor to:

refer to object information in the capture range, and detect a photographing prohibited object or a photographing prohibited avatar;

judge whether a photographing license is given to the user in a case where the photographing prohibited object or the photographing prohibited avatar is detected; and perform processing of not displaying the photographing prohibited object or the photographing prohibited avatar in a case where a photographing license is not given to the user.

2. The non-transitory computer-readable recording medium according to claim 1, wherein the processing of not displaying is transmission processing or mosaic processing for the photographing prohibited object or the photographing prohibited avatar, or transmission processing or mosaic processing for the photographing prohibited object or the photographing prohibited avatar shown in the image data.

3. A non-transitory computer-readable recording medium storing a program executed by a head-mounted display or an information processing device connected to the head-mounted display to provide virtual reality on the head-mounted display, the program causing a processor of the head-mounted display or the information processing device to:

determine a capture range in a virtual space using a hand gesture by a hand of a user in a real space or a hand gesture by an object representing the hand in a virtual space; and acquire, as image data, content displayed in the capture range in the virtual space, wherein the capture range is determined before the content is acquired, and the program further causes the processor to:

refer to object information in the capture range, and detect an unauthorized photographing prohibited object or an unauthorized photographing prohibited avatar;

judge whether a photographing license is given to the user in a case where the unauthorized photographing prohibited object or the unauthorized photographing prohibited avatar is detected; and perform processing of not displaying the unauthorized photographing prohibited object or the unauthorized photographing prohibited avatar in a case where a photographing license is not given to the user.

4. The non-transitory computer-readable recording medium according to claim 3, wherein the processing of not displaying is transmission processing or mosaic processing for the unauthorized photographing prohibited object or the unauthorized photographing prohibited avatar, or transmission processing or mosaic processing for the unauthorized photographing prohibited object or the unauthorized photographing prohibited avatar shown in the image data.

5. A head-mounted display comprising a processor configured to:

determine a capture range in a virtual space by using a hand gesture by a hand of a user in a real space or a hand gesture by an object representing the hand in a virtual space; and acquire, as image data, content displayed in the capture range in the virtual space, wherein the capture range is determined before the content is acquired, and the processor is further configured to:

refer to object information in the capture range, and detect a photographing prohibited object or a photographing prohibited avatar;

judge whether a photographing license is given to the user in a case where the photographing prohibited object or the photographing prohibited avatar is detected; and perform processing of not displaying the photographing prohibited object or the photographing prohibited avatar in a case where a photographing license is not given to the user.

6. An information processing device comprising a processor configured to:

determine a capture range in a virtual space by using a hand gesture by a hand of a user in a real space or a hand gesture by an object representing the hand in a virtual space; and acquire, as image data, content displayed in the capture range in the virtual space, wherein the capture range is determined before the content is acquired, and the processor is further configured to:

refer to object information in the capture range, and detect a photographing prohibited object or a photographing prohibited avatar;

judge whether a photographing license is given to the user in a case where the photographing prohibited object or the photographing prohibited avatar is detected; and perform processing of not displaying the photographing prohibited object or the photographing prohibited avatar in a case where a photographing license is not given to the user.

7. A head-mounted display comprising a processor configured to:

determine a capture range in a virtual space by using a hand gesture by a hand of a user in a real space or a hand gesture by an object representing the hand in a virtual space; and acquire, as image data, content displayed in the capture range in the virtual space, wherein the capture range is determined before the content is acquired, and the processor is further configured to:

refer to object information in the capture range, and detect an unauthorized photographing prohibited object or an unauthorized photographing prohibited avatar;

judge whether a photographing license is given to the user in a case where the unauthorized photographing prohibited object or the unauthorized photographing prohibited avatar is detected; and perform processing of not displaying the unauthorized photographing prohibited object or the unauthorized photographing prohibited avatar in a case where a photographing license is not given to the user.

8. An information processing device comprising a processor configured to:

determine a capture range in a virtual space by using a hand gesture by a hand of a user in a real space or a hand gesture by an object representing the hand in a virtual space; and acquire, as image data, content displayed in the capture range in the virtual space, wherein the capture range is determined before the content is acquired, and the processor is further configured to:
  refer to object information in the capture range, and detect an unauthorized photographing prohibited object or an unauthorized photographing prohibited avatar;
  judge whether a photographing license is given to the user in a case where the unauthorized photographing prohibited object or the unauthorized photographing prohibited avatar is detected; and
  perform processing of not displaying the unauthorized photographing prohibited object or the unauthorized photographing prohibited avatar in a case where a photographing license is not given to the user.

\* \* \* \* \*